Jan. 4, 1966  E. M. BORG ETAL  3,226,843
EXTRACTION MACHINE FOR USE IN MEAT CANNING
Filed July 16, 1962  6 Sheets-Sheet 1

*Fig. 1*

INVENTORS
EDWARD M. BORG, DECEASED
BY EDWARD R. TAYLOR, EXECUTOR
ROBERT MC CARTHY

BY
Robinson & Berry
ATTORNEYS

Jan. 4, 1966  E. M. BORG ETAL  3,226,843
EXTRACTION MACHINE FOR USE IN MEAT CANNING
Filed July 16, 1962  6 Sheets-Sheet 4

INVENTORS
EDWARD M. BORG., DECEASED
BY EDWARD R. TAYLOR., EXECUTOR
ROBERT MC CARTHY
BY
Robinson + Berry
ATTORNEYS United States Patent Office 3,226,843
Patented Jan. 4, 1966

3,226,843
EXTRACTION MACHINE FOR USE IN
MEAT CANNING
Edward M. Borg, deceased, late of Seattle, Wash., by Edward R. Taylor, executor, Seattle, Wash., and Robert McCarthy, Seattle, Wash.; Edward W. Taylor, executor of said Edward M. Borg, deceased
Filed July 16, 1962, Ser. No. 211,941
15 Claims. (Cl. 34—92)

The present invention relates to meat processing equipment, and more particularly to apparatus for extracting undesirable fluids from edible species of animal meat (including all elasmobranchii sea mammals and the strong flavored meats, for example) preparatory to the preservation of the meat.

In the Edward M. Borg U.S. Patent Nos. 2,411,188 (issued November 19, 1946) and 3,028,969 (issued April 10, 1963), it was explained that an undesirable liquid constituent is sealed in the cells and between the tissues of the meat of some fish and animals and cannot be removed by the ordinary draining or washing processes but, if not extracted, will cause the meat quickly to become rancid, odoriferous, and otherwise unfit for human consumption. Furthermore, as has been explained in the aforementioned Borg Patent No. 3,028,969, it is quite desirable and is commercially practical, that this liquid constituent be extracted by subjecting the meat to vacuum after it has been properly prepared for preservation but before the container in which it is to be preserved has been permanently sealed. Also, it is desirable that the extraction of this liquid be effected by certain mechanical means and in a manner that does not cause any compacting of the meat in the preserving containers which hereinafter will, for convenience, be referred to as "cans."

It is the principal object of this invention to provide a commercially practical extraction machine into which cans of meat properly prepared for extraction may be successively and rapidly delivered into pockets of a rotating turret embodied in the machine and which turret also is equipped with a succession of extraction heads and mechanisms whereby said heads are mechanically applied to the filled cans as they are successively delivered with top ends unclosed to the pockets of the rotating turret, thus to temporarily seal them for the liquid extraction. Also, to equip the machine with means whereby each can, while closed by its extraction head, is caused to be inverted and automatically connected with a source of vacuum which operates to extract the liquid constituent from the meat and cause it to drain from the can, through the head and into a liquid storage tank.

It is a further object of the present invention to provide a machine of the character above disclosed wherein the cans will be conveyed with a continuous and steady movement through the head sealing and extracting operation by a horizontally rotating turret as distinguished from the vertically rotating turret characterizing the extraction machine disclosed in the aforementioned Patent No. 3,028,969; wherein extraction is effected without compacting the meat and to and from which turret the unsealed cans may be moved in proper timing, by conventional can conveying means.

Another object of this invention is to provide the pocketed turret with extraction heads that are movable to and from temporary can sealing positions by a cam mechanism and which heads have valves, which are automatically actuated as the turret turns, to control the periods of application of extracting vacuum to the cans.

Still further objects and advantages of the present invention reside in the details of construction and combination of the various parts of the machine and in the mode of its operation, as will hereinafter be fully described.

In accomplishing the above mentioned and other objects and advantages of this invention, that will appear and be understood as this specification progresses, we have provided the details of construction, the preferred forms of which are illustrated in the accompanying drawings, wherein.

Figure 1:
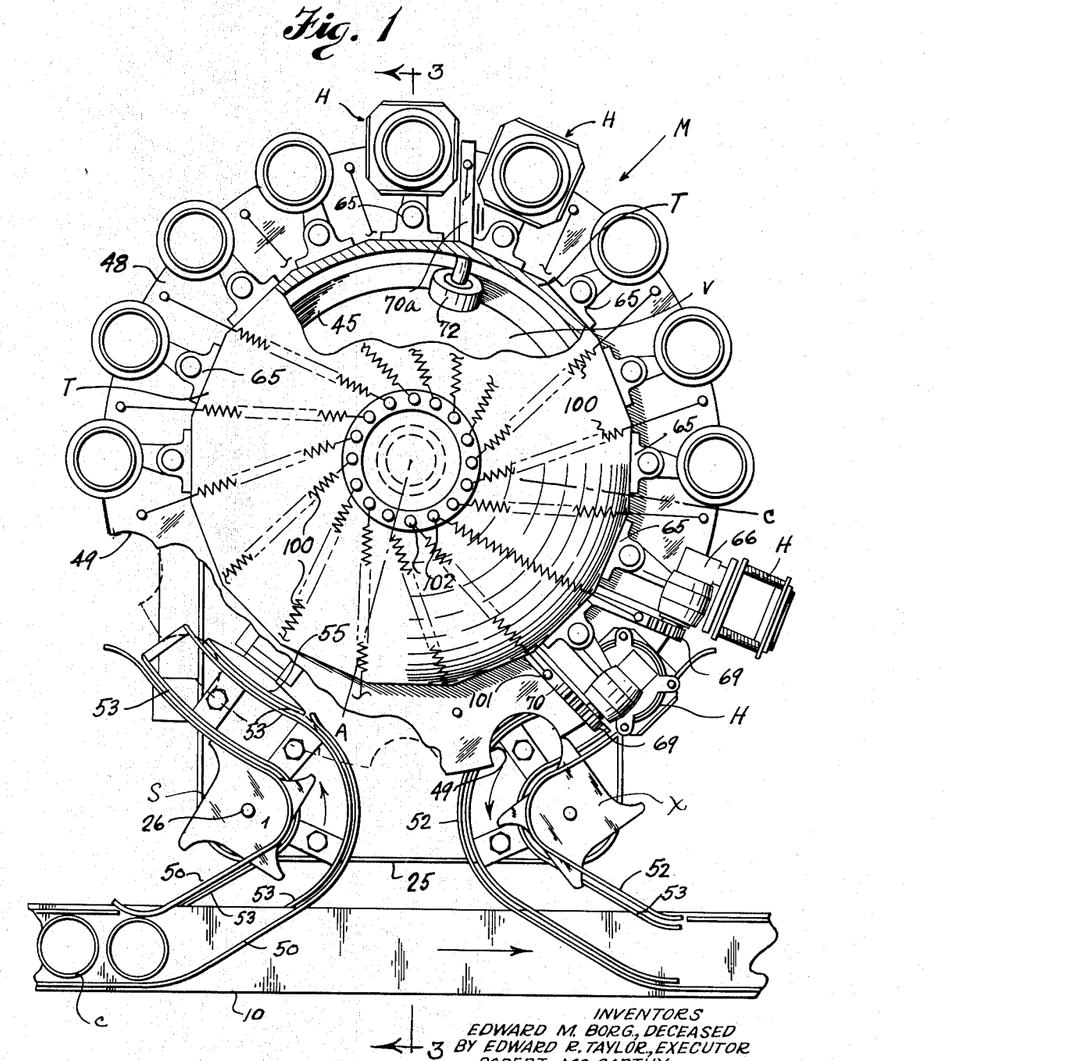
FIG. 1 is a top or plan view of an extracting machine, with a horizontally rotating turret featured by the present invention with certain parts thereof broken away and other parts omitted for explanatory purposes.
Figure 2:
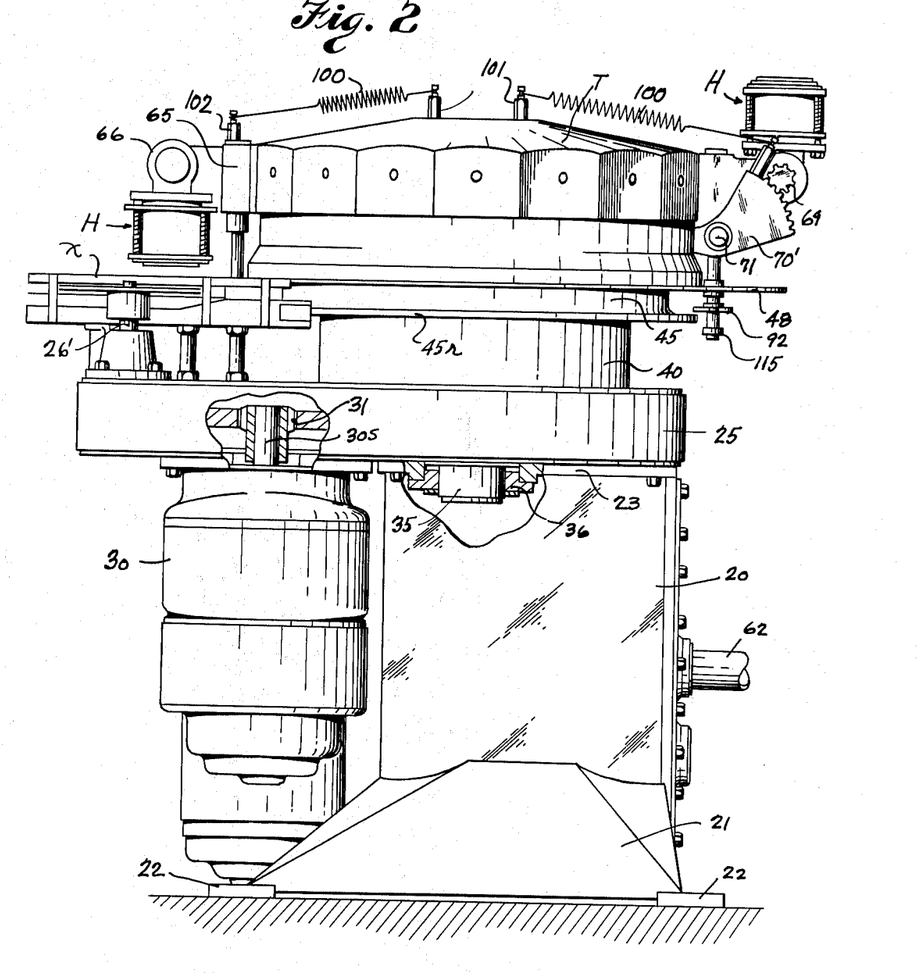
FIG. 2 is an elevation of the machine, as seen from its right hand side in reference to its showing in FIG. 1, with some parts broken away and with most extraction heads omitted to avoid confusion in illustrating.
Figure 3:
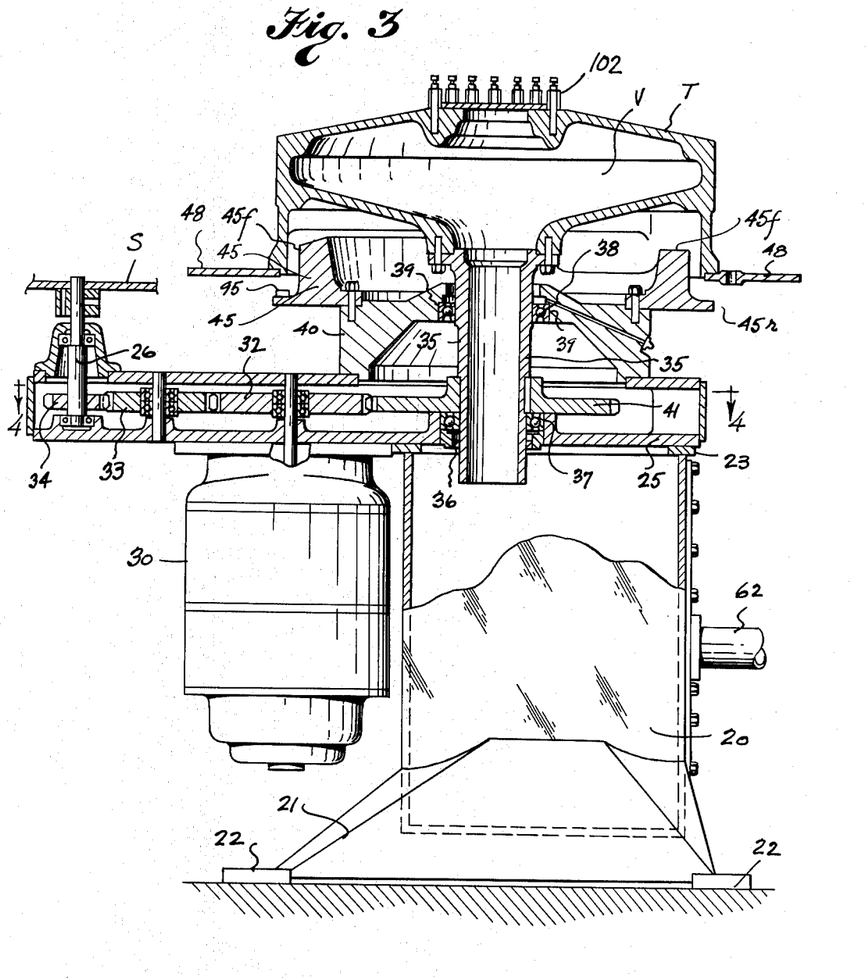
FIG. 3 is a vertical section of the machine, taken substantially on line 3—3 in FIG. 1 but with many parts omitted.

It will here be explained that in several views of the drawings, particularly in FIGS. 1, 2 and 3, many of the extraction heads and parts directly associated therewith have been omitted in order to avoid confusion of illustration and for easier explanation of parts that otherwise would be obscured. Omitted parts have, however, been shown in detail in other views as, for example, an extraction head as seen, in detail, in FIGS. 6 through 9.

The present machine is designed especially for the extraction of liquid from the prepared meat of such fish as halibut, tuna, dog shark, and other bottom fish, but is likewise practical in the same manner of use for the extraction of liquids or juices of meats of various kinds. Therefore, in the use of the word "fish" as the product under treatment, it is not the intent to confine use of the present machine to treatment of that particular source of meat but is to be understood that the designation "fish" shall apply to any meat product that, when properly prepared, is capable of being extracted by this machine.

Referring more in detail to the drawings:

It is to be observed, particularly by reference to the showing in FIG. 1, that the present machine which is therein designated in its entirety by reference character M, is of the horizontally rotating turret type and that fish, as prepared for extraction, is being delivered to the machine in conventional, open top (i.e. unclosed) containers, such as cans C of a selected standardized size. These are conveyed to the machine by a belt 10 that may be like or similar to that generally associated with many present day canning operations. The delivery of cans to the machine is timed by a rotating star wheel S and each is delivered into a pocket of a can locating disc of the rotating turret T.

Liquid extraction from the fish in the cans is effected as the latter are conveyed by the turret T between the can receiving station and the can discharge station. After extraction, cans are returned from the turret T of the machine M by a star wheel X to continue in conventional cannery procedures.

It is to be understood that timing of the operations of the various moving elements of the machine is of prime importance, and in this connection it is here pointed out that the advancement of fish filled cans to and from the turret is properly timed by use of certain gearing for driving the turret and star wheels. This gearing will presently be described.

Figure 4:
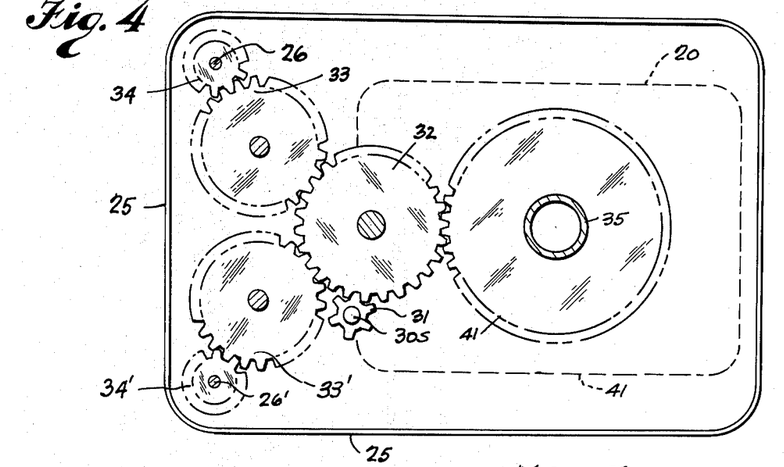
FIG. 4 is a horizontal section taken on line 4—4 in FIG. 3, showing the relationship of gears for the driving and synchronizing of the star wheels and turret.

It has been shown in the cross-sectional view of FIG. 3, that the machine comprises a supporting base portion in the form of a vertically disposed air tight tank body 20 of that substantially rectangular formation indicated in FIG. 4; this tank being closed at its lower end and formed at opposite sides, with laterally diverging leg portions 21—21 with supporting pads 22 at their lower ends adapted for securement of the machine to a floor surface. At its top end, the tank body 20 is outwardly flanged, as at 23 in FIGS. 2 and 3, for the welded securement thereover of a closing horizontal top housing 25 enclosing therein the various driving and synchronizing gears, as shown in FIG. 4, for timing the operations of the can moving parts as presently described.

The top housing or transmission gear case 25 is substantially rectangular in plan and is relatively shallow in its vertical dimension. In the application of this housing to the top end of the supporting base 20 it serves somewhat as a table top on which the turret is mounted and it is so disposed on the base 20 as to extend farther therefrom at one end than at the other thus to provide a sort of overhanging shelf as will be understood best by reference to its showing in FIG. 3. Rotatably mounted by suitable bearings in the two forward corner portions of this overhanging shelf-like portion, respectively, as shown in FIGS. 1 and 4, are vertical shafts 26 and 26'. The upper end portions of these shafts project somewhat above the top wall of the housing 25 and are there equipped respectively, with the previously mentioned star wheels S and X for the infeeding of cans C from conveyor 10 to the turret T and their return after extraction, back to conveyor 10.

The driving of the turret T and the two star wheels is effected by an electric motor 30 that is suspended as shown in FIG. 2, from the under surface wall of housing 25, directly beneath its extending end or shelf portion; the drive shaft 30s of the motor being extended vertically upward therefrom and into the housing 25 where it has a pinion gear 31 keyed thereon. This gear is in driving mesh with an idler gear wheel 32 which operates in driving mesh with two laterally spaced gears 33 and 33', of like diameter, mounted in the housing 25 and which, in turn, operate respectively in driving mesh with pinion gears 34–34' of like diameters that are keyed on the lower end portions of the vertical shafts 26 and 26' which mount the star wheels S and X at their upper ends. Thus, through this gearing, rotation of the star wheels in the same direction at the same speed is effected.

It has also been well shown in FIG. 3 that the turret T, presently to be described in detail, is mounted for horizontal rotation upon the gear housing 25, above the supporting base 20; being supported by a tubular shaft 35 that extends downwardly and rotatably through the housing 25 to open at its lower end through an air sealed joint, as at 36, into the chambered base housing 20 and to open at its top end upwardly through the bottom wall of the turret T which it supports, into its air tight chambered body. It is to be observed that this tubular shaft 35 extends through an anti-friction ball bearing raceway 37 mounted within the base wall of housing 25 and near its top end is rotatably retained in a ball bearing raceway 38 that is fitted in a seat 39 in an annular base and bearing housing 40 that is fixedly mounted on the top wall of housing 25 concentrically of the tubular shaft 35. It is also shown in FIG. 3 that the tubular shaft 35 has a gear wheel 41 keyed thereon within the housing 25 and at its top end fixedly supports the drum-like hollow turret T for rotation thereon. Also, it is shown in this same view that an annular cam 45 of a particular form, presently to be described, is fixedly secured on the top wall of bearing housing 40 coaxially thereof. This cam ring has a peripheral track forming flange 45f that projects upwardly into a recessed underside of the turret T, see FIG. 3, and has an encircling, projecting rim flange 45r that is substantially of the same diameter as the turret.

About its lower edge, the hollow, air tight turret T has an annular, horizontally disposed can positioning plate 48 fixed coaxially thereto and it is well shown in FIGS. 1 and 3 that this flange projects substantially from the peripheral sidewalls of the turret and is formed at regularly spaced intervals about its outer edge, with substantially semi-circular can seating pockets 49.

As the open top cans C, containing the properly prepared fish, are advanced to the machine on the conveyor belt 10, they are received within the flared mouth portion of a can receiving guide 50 fixed on housing 25, as shown in FIG. 1, which directs them to the turret pockets 49 incident to the feeding action of star wheel S which spaces the entering cans for their timed entry to the can seating pockets of the turret flange 48. Likewise, at the discharge side of the machine, is a can guide 52 fixed to housing 25 into which the extracted cans C are delivered in succession from the turret T by the rotating star wheel X. The containers C are then moved back onto the conveyor 10 for conveyance to a point of removal.

Figure 5:
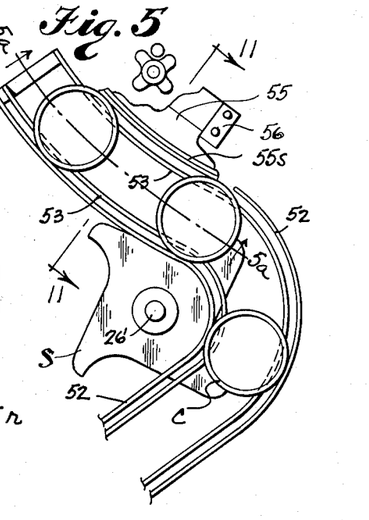
FIG. 5 is an enlarged detail, in plan, particularly illustrating the location of the can sensing mechanism in its association with the can delivery guideway leading into the machine.
Figure 5A:
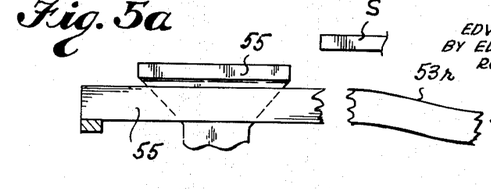
FIG. 5a is a view taken in the plane of line 5a—5a in FIG. 5.

In their travel along the guide 50 for their time entrance to the turret pockets 49, the cans ride upon a pair of parallel rails 53—53 formed with a cam rise 53r as in FIG. 5a whereby each unclosed can is caused to be slightly lifted, for a purpose to be hereinafter explained. In the final travel of each can C along the entering guideway 50, after it has been covered by an extraction head, the vacuum control valve of the extraction head is opened for the purpose of liquid extraction by vacuum pull.

With the advance of each can C between the laterally spaced parallel rails of the guide 50 under influence of star wheel S, it is caused to engage at its inside edge with and to actuate a can sensing shoe 55. The purpose of the actuation of this shoe is to cause opening of the vacuum applying valve of the corresponding extraction head, but to open this valve only in case of a can C being in position for liquid extraction. If no can C happens to be in position in pocket 49, the vacuum valve of the corresponding head remains closed and no vacuum is wasted from the turret. It has been shown by the plan views of FIGS. 1 and 5 and in enlarged section in FIG. 1, that this shoe 55 extends along one side of the guideway 50 in position to be engaged by each passing can and to be pushed slightly outward by each can C. It is shown particularly by FIGS. 5, 11 and 12 that the shoe 55 comprises a body of material that is pivotally mounted at its lower edge between spaced blocks 56—56 by a horizontal bolt 57 for limited rocking movement toward and from the guideway. A small coil spring 58 is disposed under compression between the inside edge portion of the body and top wall of housing 25 to yieldingly urge the arcuately curved longitudinal can contact portion 55s of the shoe into the can path. Further description of the operation of the can sensing shoe will be given after describing the construction and mode of operation of the extraction heads that are mounted on the turret T.

It is to be observed by reference to FIG. 1 that the turret T is of drum-like formation and the body chamber V thereof is enclosed by vertical sidewalls that are provided exteriorly with a succession of flattened surfaces, each in the present instance extending through an arc of 22½ degrees. Mounted on each of these flat side surfaces is what has herein been designated as an "extraction head assembly," each head being herein designated in its entirety by reference letter H and is of that construction illustrated in FIGS. 6, 7, 8 and 9; the purpose of these sixteen heads H being first to temporarily seal the cans C in their successive entry to the machine; to invert the can C for the extraction of liquid from the fish and to permit the draining of the extracted liquid into the head and from it into the turret T and finally into the chambered base 20; then to return the can to upright position for conveyance from the machine. Before further describing the construction of the extraction heads H and their mode of operation, it will be explained that in this operation a predetermined degree of vacuum is drawn and maintained in the chambered base 20 and chambered turret T as mounted thereon, through a pipe connection 62 leading directly to the base, as in FIGS. 2 and 3 from a source of vacuum not herein shown (this vacuum further serves as the sole means of maintaining the temporary sealed relationship of can and extraction head), and then transmitted from the base of the turret chamber V through the tubular, turret mounting shaft 35.

Figure 6:
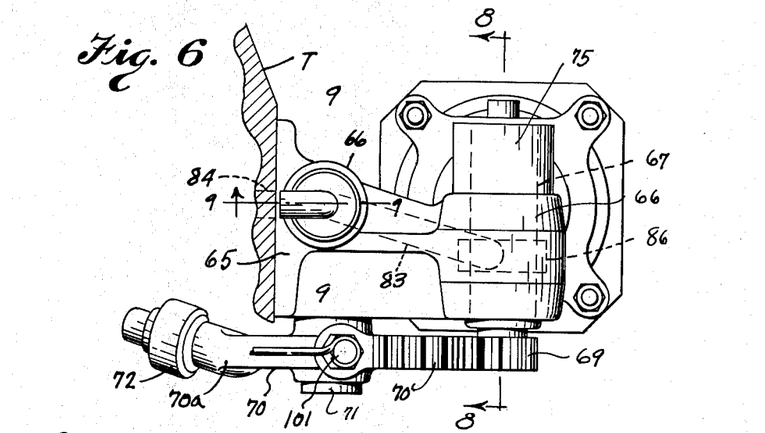
FIG. 6 is a top view of one of the head assemblies mounted by the turret.
Figure 7:
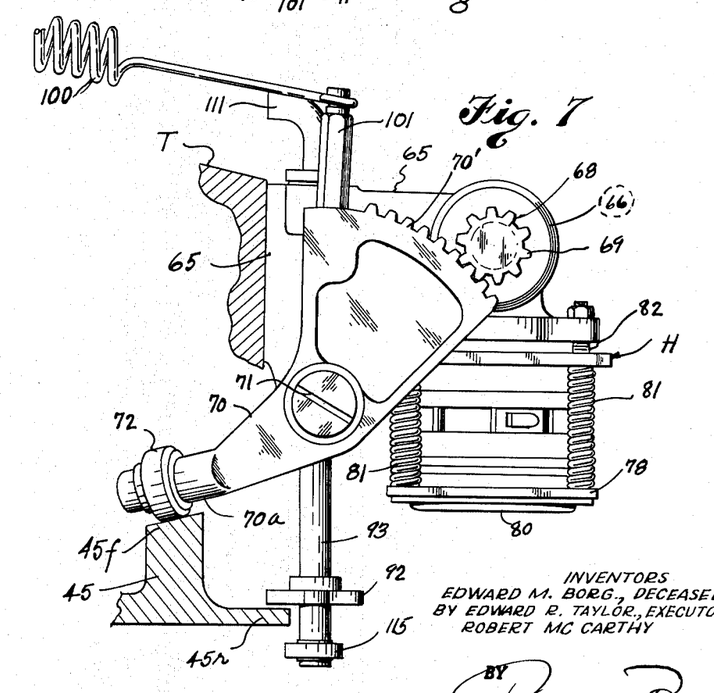
FIG. 7 is a side view of the assembly as seen in FIG. 6.
Figures 8, 9, 10:
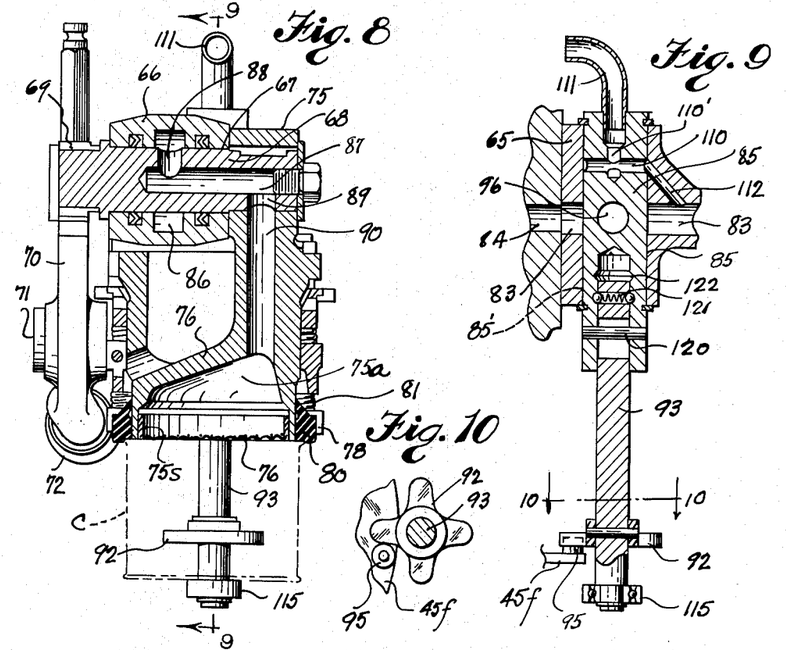
FIG. 8 is a vertical section taken on line 8—8 in FIG. 6.
FIG. 9 is a vertical section taken on line 9—9 in FIG. 8 showing the vacuum control valve of the air head.
FIG. 10 is a horizontal section, on line 10—10 in FIG. 9 showing the valve shaft actuating star wheel.

Each of the locating heads H, is as that shown in FIGS. 6, 7 and 8. Each is operatively supported on a flat vertical side surface of the turret T by a bracket 65 as well shown in top view in FIG. 6. All brackets are bolted in air tight joints to the turret wall to project radially outwardly therefrom and each bracket terminates in a hub portion 66 that is formed with a horizontal bore 67 parallel with the flat surface on which the bracket is based, through which a valve member 68 rotatably extends. The opposite end portions of this valve member 68 project from opposite ends of the hub, as in FIG. 8, and at one end is formed with a pinion gear 69 meshing, as in FIG. 7, with a gear toothed arcuate edge 70' of a quadrant lever 70 that is pivotally mounted by a pin 71 that is fixed horizontally in the bracket 65. The gear toothed outer arcuate surface 70' of each quadrant is centered in the axial line of the segment mounting pin 71 and the lower inner end of the quadrant arm 70a has a roller 72 mounted thereon for rolling travel on the top edge of the annular cam flange 45f that is fixed on the top wall of bearing housing 40, within the enclosing skirt portion of the turret, as shown in FIG. 1.

Keyed to that end of the valve member 68 that is opposite the end that mounts the quadrant actuated pinion gear 69, is the mounting boss 75 of extraction head H. The body of each head H is of substantially cylindrical formation, as best shown in FIGS. 6 and 8, and it is best shown in FIG. 8 to be closed between its bottom and upper ends by a partition wall 76 that sets off a downwardly opening suction cup 75a in the lower end of the head and within the open lower end of which cup a sleeve 75s is fitted. This sleeve, of each head mounts a screen 76 of fine mesh across the open lower end or mouth of the cup, the function of this screen being to retain the fish in the can C as covered by the head during the liquid extracting operation, as presently will be explained.

Slidably fitted about the outside of the lower end portion of the cylindrical head 75, as best seen in FIG. 8, is a collar 78 that mounts an annular rubber can sealing gasket 80 about the lower edge of the cup wall. When the top end of a fish filled can is lifted against the sealing gasket of a head for liquid extraction, as has been indicated by the showing of the can in FIG. 8, the peripheral top end flange of the can bears tightly against the gasket 80 to effect an air tight joint. The gasket, as mounting, is caused to be yieldably pressed tightly against the can flange by a plurality of coil springs 81 seen in FIG. 7, that are mounted on guide rods 82 that are fixed to and which extend at spaced intervals along the outside of the head.

Vacuum for extraction, is brought to each of the succession of extraction heads under individual valve control, as the turret rotates and at a predetermined point in its rotary travel. It is shown in FIGS. 6 and 9 that each bracket 65 is formed with a horizontal bore 83 which registers at its inner end with a hole 84 opening through the turret wall on which the bracket is mounted and into the turret chamber V. This bore 83 leads outwardly directly through a vertical bore 85' formed in the base portion of the bracket 65 as shown in FIGS. 6 and 9 and in which vertical bore a vacuum control valve member 85 is rotatably fitted. At its outer end the horizontal bore 83 communicates with an annular channel 86 formed in the bracket hub 66 about the rotatable drainage valve member 68 as fitted in the horizontal bore 67 as shown in FIG. 8. Valve member 68 is formed with an axial bore 87 closed at its ends, and which has a radial passage 88 at one end opening into the annular channel 86 and at its other end has a radial passage 89 that opens therefrom for its registration with a channel 90 leading into the top wall 76 of suction cup 75a, as shown best in FIG. 8.

Figure 11:
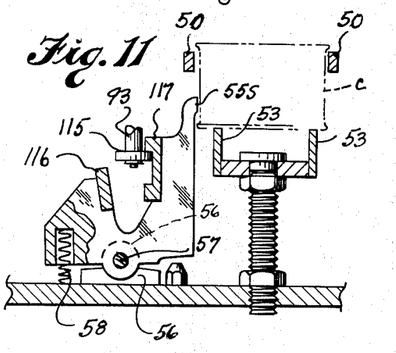
FIG. 11 is a vertical cross-section taken on line 11—11 in FIG. 5 showing the can sensing head as actuated by a passing can.

The arrangement of passages as above disclosed provides that when an extracting head H is swung downwardly from an upwardly directed position, opposite that in FIG. 8, to the downward position of FIG. 8, a vacuumizing connection in the head will be established but will be made with the vacuumized turret T only if valve 85 shown in FIG. 9, is opened, such valve only to be opened by the presence of a can C as best shown in FIG. 11.

The swinging of each head H from its upwardly directed position, as at the right hand side of FIG. 2, to a downwardly directed position for can release after extraction, as shown at the left hand side in that same view, is incident to the travel of the cam follower rollers 72 along the top surface of the fixed annular cam 45 which is so designed and positioned as to cause each head to swing from that upwardly directed position to the downwardly directed position as the head approaches the can exit point in the can guideway and remain in that down position until they pass the can sensing shoe 55.

Each entering can C of fish is caused to be lifted slightly by the can track rails 53—53 on which it travels as it moves into a position axially aligned with a down turned extraction head H, and in its approach to the can sensing shoe 55 its lifting movement is such that its open top end is pressed into air sealing contact with gasket 80 of the head H aligned therewith as in FIG. 8, thus to prepare for extraction. With the full closing of a can C against a head H, the vacuum valve 85 of the can engaging head is opened. This valve opening in each extraction head H is effected by a small, four pointed star wheel 92 that is fixed on the lower end of a valve rotating stem 93 as shown in FIG. 9; the star wheels 92 individually controlling the valves 85 of the several heads being adapted to successively engage in passing the sensing head 55 with a stud 95 that is fixed in the encircling flange 45r of the fixed cam 45, as shown in FIGS. 9 and 10, thus to rotatably actuate the normally closed valve 85 through a 90° turn to bring an air passage 96 that is formed therethrough into alignment with the bore 83 formed in the valve mounting bracket.

With the opening of valve passage 83, the atmospheric pressure within the can is so reduced that the external atmospheric pressure forces the can into temporary sealed connection with the head and permits the movement in conjunction with the head through 180° upward arc to the position where liquid extraction will take place. This movement of the head H is caused by action of the corresponding segment 70 and cam 45, to upright position as in FIG. 2 thus to cause any extracted liquid to flow from the can into cup 75a of the head and drain through passages 90, 87, 86, 83 and 84 to the turret chamber, to pass downwardly therefrom through hollow shaft 35 into tank 20. As each head approaches the can discharge point, it is then swung downwardly for can release. Vacuum in the can C is there cut off by rotation of valve 85 and the can C released for pick up by the star wheel X and its removal from the machine M. The return of each extraction head from upright to down position is effected under control of cam 45 and by pull of a coiled spring 100 corresponding to that head that is attached under tension at one end to a stud 101 extending upwardly from the gear toothed edge 70' of the segment 70 and at its other end to a stud 102 that is fixed in the top wall of the central portion of the turret T; the springs for the several heads being arranged as shown in FIG. 1. The points for head down swinging is indicated to be at the radial line P1 in FIG. 1 and the point of up swinging is at the radial line P2 in that same view. With the down swing of the head for can removal at the radial line P3, vacuum in the can C is relieved as now explained, by the rotative adjustment of the vacuum cut off valve 85.

It is shown in FIG. 9 that each valve 85 has a diametric air passage 110 through the upper end portion with an upwardly opening passage 110' to an open air tube 111, With each 90° rotative adjustment of valve 85 that closes the vacuum applying connection one end of the passage 110 is moved into registration with an air passage 112 leading in bracket hub 66 to passage 83, as shown in FIG. 9, thus to break the vacuum in the can C and cause the impact of incoming atmosphere air to unseat the can C from the head for its passage into the guideway 52 for pickup and removal by star wheel X to conveyor 10.

The means for preventing opening of the vacuumizing valves 85 in the event of there being no can C entering to register with a head H at the can entering point, is shown in connection with FIGS. 9, 11, 12 and 13. It is therein observed that an annular collar 115 is mounted on the lower end of each valve rotating stem 93, slightly below the star wheel 92.

Figure 12:
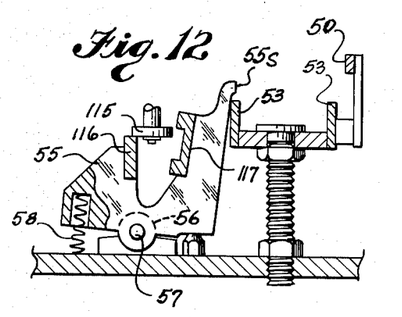
FIG. 12 is a cross-section similar to that of FIG. 11 but showing the position of parts of the can sensing head when no can is passing it.
Figure 13:
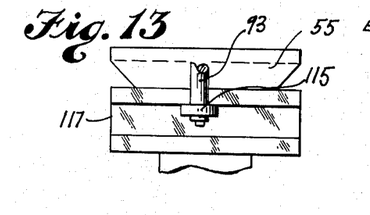
FIG. 13 is a side elevation showing the valve actuating cam bar as applied to the can sensing head.

It is also to be understood that ordinarily the can sensing shoe 55 is urged by its spring 58 to its outwardly leaning position of FIG. 12, but with the passing of each can C along the guideway, it is engaged thereby and urged to that inwardly tilted position of FIG. 11. It has also been shown that the body portion of this shoe 55 mounts two cam plates 116 and 117 parallel with the guideway above the pivot 57, as in FIG. 13. With the passing of each entering can, the shoe is tilted inwardly thereby and this tilting causes the collar 115 on stem 93 to engage the under edge of cam rail 117 as in FIG. 11 in such manner as to hold the stem 93 against lifting thus to insure the star wheel 92 thereon will engage the stud 95 on cam flange 45r to open the valve, 85. If no can is entering, the can sensing shoe is not tilted and the collar 115 will engage with and ride up on the cam plate or rail 116 as in FIG. 12, thus to lift the star wheel 92 above the level of the stud 95 and thereby prevent opening of the valve and an incident loss of vacuum.

It is to be observed further by reference to FIG. 9 that the valve stem 93 is slidably keyed in the valve body for limited lifting and lowering by the pin and slot connection shown at 120, and that the shaft is yieldingly retained at each limit of endwise movement by spring pressed ball latches 121 adapted to engage annular channels 122 in the wall surface of the valve containing bore.

Figure 4A:
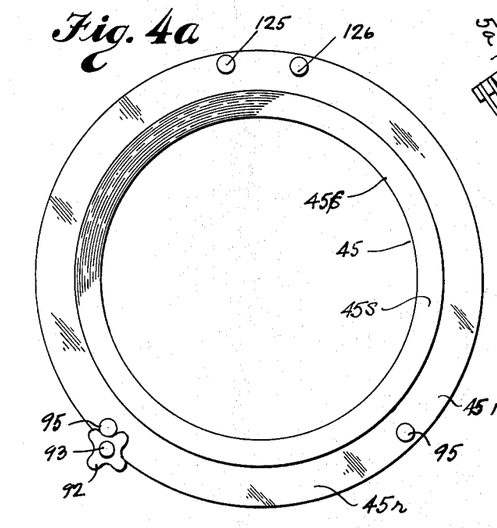
FIG. 4a is a plan or top view of the stationary cam ring for actuation of the extraction heads between can closing and open positions.

The present machine further provides that a sort of pumping action may be produced by an intermittent application and cutting off of vacuum as produced by placing studs at various places along the periphery of the cam flange 45r to engage and actuate the star wheel 92 to close and open the vacuum valve 85. Studs for this purpose have been shown at 125–126 in FIG. 4a.

This machine provides for a rapid practical and effective means for liquid extraction from the fish in the cans and the drawing of the extracted liquid into the tank 20 from which it can be removed as necessary through an outlet valve designated at 130.

What I claim as new is:

1. A machine for the extraction of liquid constituent from fresh meat products as packed for extraction in unclosed cans; said machine comprising a rotatably mounted turret joined with a vacuum chamber, means mounting said turret for rotation about a vertical axis, means for the delivery of cans packed for extraction to the turret in succession, a succession of extraction heads operatively mounted on and movable with the turret, mechanisms operable with the rotation of the turret for causing said heads to be successively applied to the unclosed cans as successively delivered thereto for their extraction as moved by the turret through a predetermined extracting arc; each extraction head having a vacuumizing passage leading therethrough from said vacuum chamber to provide for the application of extracting vacuum to each can upon its being closed by a head, a normally closed valve in each vacuumizing passage, means operable, incident to rotative travel of the turret and the delivery of a can thereto to open the valve of the corresponding closing head to effect application of extracting vacuum to the can, means for closing the valve as the closed can approaches the end of the extracting arc, and means for removal of the extracted cans from the rotating turret after their extraction.

2. A machine according to claim 1 wherein a can delivery guideway leads to the turret, and can feeding means is associated therewith for the timed delivery of cans along the guideway, to the turret, in accordance with the movement of said heads to axial alignment with cans, and wherein a can sensing device is positioned for actuation by each can as delivered to the turret to open the valve of the vacuumizing passage of the corresponding head for the extracting operation during travel of the can along the extracting arc.

3. A machine according to claim 1 including valve actuator means located at predetermined intervals along the extracting arc of travel of the cans for opening and closing the valves of the extraction heads in response to rotative travel of a can as a head carries said can through the extracting arc.

4. A machine according to claim 1 wherein each extraction head is mounted on the turret for swinging movement about a horizontal supporting axis from its position of application to the open top of an entering can to a substantially inverted position to effect the inversion of the can and for the discharge from the can of extracted liquid through the extraction head passage to the vacuum chamber.

5. A machine according to claim 1 wherein said extraction heads are each mounted on the turret for swinging movement about a horizontal axis from a position for direct application to the top of an entering can, to an inverted position to carry the can to an inverted position, and wherein a lever for actuating each head is pivoted to the turret and has operative connection at one end with the head for effecting its swinging actuation and has a cam follower at its other end disposed to travel in camming contact with a fixed annular cam to effect actuation of the head as the turret rotates about its axis.

6. A machine for the extraction of extractable liquid constituent from products packed in unclosed cans; said machine comprising, in combination, a turret mounted for horizontal rotation and formed with a vacuum chamber, a can seating band fixed to and about the turret and formed at regular intervals therealong with can seats, a feed mechanism for moving cans to and for seating them successively in the seats at one side of the turret and for successively removing them from their seats as they reach the end of the extraction arc, extraction heads mounted on the turret in accordance with the angular spacing of the can seats in the can seating band, means on the turret for actuating each head to axial alignment with the can as the can is received in the corresponding seat and for actuating the head from the can as the can approaches the end of the extracting arc; each head having a can vacuumizing passage therethrough for connecting the can as connected with the head to the vacuum chamber and a control valve in the passage means controlled by each can as delivered into the machine, to open the valve of the head for effecting extraction and for closing the valve at the end of the vacuumizing period and means associated with each head for causing the head and can to be inverted during the vacuumizing period for draining extracted liquid from the can into the vacuum chamber.

7. A machine of the character described, for the extraction of extractable liquid from products packed for extraction in open cans, comprising in combination, a horizontally revolving turret connected with an enclosure providing a continuous source of vacuum, means for delivery of said open cans in upright position and in succession to the turret, extraction heads mounted by the turret and movable therewith for application in succession to the open ends of said cans as they are successively delivered to the turret, means for the inversion of the heads and cans to which they are applied as conveyed through a predetermined arc of turning of the turret, means for applying vacuum through each head as applied to a can, to effect extraction of material in the can, means for effecting the return of the cans and heads to normal upright position at the end of the extraction arc, means controlled by the rotative movement of the turret for the inversion of the can and heads and for effecting the extraction and drainage of extracted liquid from the cans, through the heads to the said enclosure.

8. A machine of the character described, for the extraction of undesirable liquid constituents from meat products that have been packed into cans and have been given preparatory treatment for preservation, but before the containers are finally closed, comprising in combination a rotatably mounted turret; a vacuum chamber joined to said turret; means for effecting rotation of said turret upon a vertical axis and in a horizontal plane; means for delivery of filled unclosed cans in normal upright position to the turret in succession; a plurality of extraction heads operatively mounted on and movable with the turret; mechanism operable with the rotation of the turret which causes said extraction heads to be successively applied in temporary sealed connection with the filled open cans as successively delivered thereto; means for retaining substantially solid contents within the cans while permitting withdrawal of some liquid constituents therefrom; mechanisms operable with the rotation of the turret for causing the extraction heads with filled cans in temporary sealed connection therewith to be successively inverted 180° while the turret continues to rotate through a predetermined horizontal arc; each extraction head having a vacuumizing passage leading therethrough from said vacuum chamber to provide for the application of extracting vacuum to the contents of each can while it is in a temporary sealed connection with its extraction head and in an inverted position and to permit drainage of liquids withdrawn from the contents of the can to a storage tank; a normally closed valve in each vacuumizing passage; means operable incident to axial alignment of each successively delivered can and its corresponding extraction head, and to rotative travel of the turret, to open the valve of the corresponding extraction head to effect a first temporary sealed connection between a filled open can and an extraction head and thence extraction of liquids from the contents thereof when the head and the can have been inverted 180°; means for reverting the cans 180° to normal upright position while still in temporary sealed connection with the extraction head and approaching the end of a predetermined arc of the rotating turret; means for closing the valve in each vacuumizing passage and simultaneously introducing atmospheric pressure into each successive extraction head to rupture the temporary sealed connection with the can, and means for discharge of the can from the machine upon release from the extraction head with contents of the can in a new state brought about by removal of undesirable liquid constituents therefrom.

9. A machine according to claim 1, wherein the turret is mounted for rotation by a vertical tubular shaft, and the lower end of such shaft extends into said vacuum chamber, said tubular shaft having a passageway extending therethrough that forms a part of the said vacuumizing passage extending from said vacuum chamber to and through each extraction head.

10. For use in removing undesirable fluids from animal meat packed in open top containers, prior to final preservation of said meat, an extraction machine comprising:
 (a) a source of vacuum;
 (b) a turret;
 (c) means mounting said turret for horizontal rotation about a vertical axis;
 (d) a hollow extraction head having inboard and outboard ends, with said outboard end being formed to include a fluid inlet;
 (e) means mounting said extraction head onto said turret for swinging movement of said outboard end along a vertical arc between a down position, wherein said inlet is directed generally downwardly, and an up position, wherein said inlet is directed generally upwardly;
 (f) means establishing a container receiving station contiguously below a portion of the horizontal arcuate path of said extraction head;
 (g) means establishing a container discharge station contiguously below another portion of the horizontal arcuate path of said extraction head, at a location circumferentially spaced from said container delivery station;
 (h) means for delivering an open top container of animal meat to said receiving station;
 (i) means responsive to rotative travel of said turret for causing said extraction head to enter the region of said receiving station in a down position, and in a manner such that its outboard end engages the upper edge of an open top container of animal meat at such station, and to then swing upwardly into its up position and stay in such position for awhile, and then later swing downwardly, back along the same vertical arcuate path, to its down position, as said extraction head is rotated from said receiving station to said discharge station; and
 (j) fluid conduit means for communicating the interior of said extraction head, and hence the contents of an open top container of meat situated outboardly of and engaged by the outboard end of said head and in communication with the fluid inlet, with the source of vacuum.

11. An extraction machine according to claim 10, wherein said conduit means includes valve means which is closed during rotation of said extraction head from said discharge station to said receiving station, and is open during at least a portion of the rotative travel of the extraction head from said receiving station to said discharge station.

12. An extraction machine comprising:
(a) a source of vacuum;
(b) an extraction head mounting member;
(c) a hollow extraction head having inboard and outboard ends, with said outboard end including a fluid inlet opening into the interior of said extraction head;
(d) hinge means mounting said extraction head onto said extraction head mounting member, said hinge means comprising:
> (1) a horizontally disposed first tubular member affixed to said extraction head mounting member, and
> (2) a horizontally disposed second tubular member affixed to said extraction head adjacent the inboard end thereof, said second tubular member being concentrically arranged with said first tubular member, with one of said members interfittingly engaging the other; and (e) conduit means interconnecting the source of vacuum and the fluid inlet, said conduit means including a passageway formed in the inner one of said concentrically related tubular members, a port in the inner tubular member communicating said passageway with the hollow interior of said extraction head, an annular groove formed in the inside wall of the outer tubular member, a port communicating the longitudinal passageway in said inner tubular member with said annular groove, and passageway means communicating said annular groove with the source of vacuum.

13. In an extraction machine:
(a) a turret mounted for rotation about a vertical axis;
(b) an extraction head having inboard and outboard ends and being formed to include a fluid inlet in said outboard end, a fluid outlet therein adjacent the inboard end, and a passageway extending therethrough and communicating said fluid inlet with said fluid outlet;
(c) means mounting said extraction head onto said turrent for swinging up and down movement of said outboard end along a vertical arc and about a horizontal axis;
(d) means for causing said up and down movement of said extraction head in response to rotational movement of said turret, said means comprising:
> (1) a cam ring situated inboard of and being concentrically related to the rotational path of said extraction head, said cam ring including an upwardly directed cam track having raised and lowered portions,
> (2) a lever arm pivotally mounted intermediate its length to said turret and including an inboard portion mounting a cam follower at its terminal and an outboard portion carrying an arcuate gear toothed rack at its terminal, and
> (3) a gear wheel affixed to said extraction head, with the teeth thereof meshing with the teeth of said rack,
>> with the raised portions of the cam track causing upward movement of the cam follower and the inboard portion of said lever arm and downward movement of the outboard portion of the lever arm and the rack carried thereby, and with the rack in turn rotating the gear wheel and causing upward swinging movement of said extraction head;

(e) a source of vacuum; and
(f) conduit means communicating the fluid outlet of said extraction head with said source of vacuum.

14. The combination of claim 13, further including spring means urging the cam follower against the cam track.

15. An extraction machine comprising:
(a) a tank connected to a source of vacuum, said tank having a top;
(b) a turret disposed above said tank and including a vertical shaft extending downwardly through an opening in the top of said tank;
(c) bearing means mounting said turret and said shaft for rotation about a vertical axis;
(d) rotating-to-nonrotating seal means forming an airtight joint where said vertical shaft enters the top of the tank;
(e) an extraction head mounted on said turret substantially radially outboardly of the center of rotation of said turret, said extraction head having a fluid inlet; and
(f) fluid passageway means extending from said tank, through said vertical shaft and said turret to and through said extraction head to said inlet, said passageway means serving to communicate said fluid inlet with the interior of said tank and with the source of vacuum.

References Cited by the Examiner
UNITED STATES PATENTS

| | | | |
|---|---|---|---|
| 2,176,126 | 10/1939 | Everett | 34—105 |
| 2,620,112 | 12/1952 | Hohl | 34—105 |
| 2,885,845 | 5/1959 | Ryan | 53—112 |

FOREIGN PATENTS

| | | |
|---|---|---|
| 642,341 | 6/1962 | Canada. |

ROBERT A. O'LEARY, *Primary Examiner.*
NORMAN YUDKOFF, *Examiner.*